(12) United States Patent  
Gunn et al.

(10) Patent No.: US 6,487,017 B1
(45) Date of Patent: Nov. 26, 2002

(54) TRIMODAL MICROLENS

(75) Inventors: Thomas V. Gunn, Candia, NH (US); Michael P. Schmidt, Hollis, NH (US); Wesley H. Halstead, Sammamish, WA (US); Richmond F. Hicks, Nashua, NH (US)

(73) Assignee: Bae Systems Information and Electronic Systems Integration, Inc, Nashua, NH (US)

( * ) Notice: Subject to any disclaimer, the term of this patent is extended or adjusted under 35 U.S.C. 154(b) by 0 days.

(21) Appl. No.: 09/621,145

(22) Filed: Jul. 21, 2000

Related U.S. Application Data

(60) Provisional application No. 60/145,548, filed on Jul. 23, 1999.

(51) Int. Cl.[7] .............................................. G02B 27/44
(52) U.S. Cl. ........................ 359/566; 359/569; 349/61; 349/95
(58) Field of Search ................................ 359/615, 566, 359/565, 569; 349/61–64, 95

(56) References Cited

U.S. PATENT DOCUMENTS

| | | | | |
|---|---|---|---|---|
| 4,079,411 A | * | 3/1978 | Engelbrecht et al. | 348/291 |
| 5,310,623 A | | 5/1994 | Gal | |
| 5,482,800 A | | 1/1996 | Gal | |
| 5,497,269 A | | 3/1996 | Gal | |
| 5,781,257 A | | 7/1998 | Gal et al. | |
| 6,078,371 A | * | 6/2000 | Ichikawa et al. | 349/95 |
| 6,351,334 B1 | * | 2/2002 | Hsieh et al. | 349/61 |

* cited by examiner

Primary Examiner—Audrey Chang
Assistant Examiner—Fayez Assaf
(74) Attorney, Agent, or Firm—Scott J. Asmus; Maine & Asmus

(57) ABSTRACT

A trimodal microlens configuration is provided for the lenses in a microlens array utilized as a diffraction separator for generating separated bands of different color when the microlens array is provided with a collimated light source. To provide the trimodal functionality, each microlens is divided up into three segments, with the center segment providing a red, green, blue diffraction pattern, with the left segment providing a blue, red, green diffraction pattern, and with the right segment providing a green, blue, red diffraction pattern. This pattern is directed towards an adjacent liquid crystal color display in which its sub-pixels are arranged red, green, blue, with the green sub-pixel aligned with the center segment of the corresponding lens. The result of the trimodal lens is an overlapping of illumination for each of the sub-pixels in that the lens segment aligned with the particular colored sub-pixel provides one third of the light, with the other two thirds of the light being provided by adjacent segments of the lenses in the microlens array. The result of the overlapping illumination of the sub-pixels is that the viewing direction is symmetric about a normal to the array which makes the design of the diffuser used with liquid crystal displays quite simple and eliminates off-axis dead zones. The trimodal structure of the microlens also permits fabrication of a thin lens which minimizes the number of steps for a diffraction line and thus limits the number of etching steps required as well as making the etching process easier to control.

7 Claims, 4 Drawing Sheets

TRIMODAL MICROLENS

This patent is a Provisional Application Serial. No. 60/145,548, filed Jul. 23, 1999.

FIELD OF THE INVENTION

This invention relates to diffractive color separation and more particularly to a diffraction color separation microlens which is trimodal.

BACKGROUND OF THE INVENTION

It will be appreciated that color liquid crystal display panels are routinely utilized in laptop computers. However, these displays are not generally sunlight viewable due to the reflection of the sunlight back towards the viewer. In an effort to provide such displays with enough brilliance and enough color saturation to be able to be viewed in direct sunlight, recently a liquid crystal display has been provided with a microlens array in which the colors from a light source are separated out into distinct bands which illuminate the various red, green and blue sub-pixels associated with the display.

The microlens array used for diffractive color separation may be made in accordance with U.S. Pat. No. 5,600,486, incorporated herein by reference, in which there are only a few steps in each diffraction line of the lens. Recently by applying a genetic algorithm, a large number of steps are provided per grating line to improve color separation and saturation. In this improvement over the Gal et al Patent, a microlens array is provided in which each microlens diffraction grating has a large number of steps for each grating line. However, the thickness of such a microlens in one embodiment is on the order of 12 microns. The 12 micron thickness is required due to the microlens design in which all portions of the microlens contribute to the red, green and blue bands of light imaged on the sub-pixels of the color liquid crystal display. Because of the many steps for each diffraction line a deeply etched structure is required. Generating such a deeply etched lens is difficult due to the multiple masks required and extensive process control, as will be appreciated control difficulty is proportional to the etch depth. It is therefore desirable to provide a microlens in which etch depth can be minimized so as to bring down the overall thickness of the lens from a 12 microns thickness to a 4 microns thickness. The result of so doing is to decrease the etching time and increase etch accuracy. Additionally, the ability to limit the etch step depth decreases the number of different masking steps necessary to provide the various steps in the diffraction grating.

Moreover, with the aforementioned microlens arrays it will be appreciated that each microlens is responsible for separating collimated light into three colored bands, each focused on one of the three sub-pixels. What this means is that for sub-pixels which are not the center sub-pixel, namely the red sub-pixel and the blue sub-pixel, light exiting the sub-pixel is not symmetrically distributed around the normal to the face of the display. What this means is that in uncompensated displays the observer must move his or her head to the left or right in order to see the red or blue hue. For the red pixel for instance, if the person's head is to the left of the normal, the individual may see no color at all or a black region. What this means is that for displays which are not angle corrected, off-normal viewing is impeded.

In the past, in order to correct for the off-normal viewing a properly designed diffuser adjacent the front face of the liquid crystal display is required to distribute the light into the appropriate viewing angle. However the design of such a diffuser is made somewhat complicated by the non-symmetrical light emanating from the red and blue sub-pixels.

By way of further background, U.S. Pat. No. 5,781,257, incorporated herein by reference, describes a flat panel display utilizing the microlenses. U.S. Pat. No. 5,497,269, incorporated herein by reference, describes a dispersive microlens for use in detecting multiple, different wavelengths and for combining a plurality of different, emitted wavelengths. As illustrated in U.S. Pat. Nos. 5,482,800 and 5,310,623, a method for fabricating microlenses utilizing photolithographic techniques is described.

SUMMARY OF THE INVENTION

In order to provide for a thinner microlens structure involving significantly less etch step depth and in order to correct for non-symmetrical distribution of light from the non-center sub-pixels, in one embodiment a trimodal lens is provided with a central region which diffracts the light about a normal thereto in the usual red, green, blue diffraction pattern. This is accomplished by the center third of the lens. The left hand third of the lens has specially configured diffraction lines to provide a blue, red and green diffraction pattern and the right hand third has specially configured diffraction lines to provide a green, blue, red diffraction pattern. The result is that for any sub-pixel, its light comes from the lens segment immediately in front of it and two adjacent lens segments such that the cone of illumination is symmetric about a normal to the microlens array and has the viewing direction. This eliminates the dead zones associated with single mode microlenses.

As a result, all light from a sub-pixel exits in a cone symmetrical about this normal, thereby minimizing the viewing angle discrepancy, and permitting a much simplified diffuser for the liquid crystal display.

In addition to solving the viewing angle discrepancies associated with prior microlens diffractive separators, the subject array of microlenses can be fabricated more exactly due to the thinness of the microlens and decrease in depth of the etching steps. The reason is that since a sub-pixel has light from the three closest symmetrically arranged microlens segments, a single segment need not output light at a larger angle, as in the case with a single mode lens. A significant portion of the etch depth is due to the focusing requirement. With the reduced focusing requirement of the trimodal lens, the total etch depth is reduced dramatically.

The iterative algorithm for defining the stepped structure and the fresnel focusing is now described. For purposes of this invention a genetic algorithm is an iterative method to design the surface profile of the color separator by defining several physical features of the surface profile as genes which are allowed to evolve to an optimal solution. For the present purposes the gene involved is the width of each of the optical elements. Other factors include the design wavelength and the focal plane as physical constraints. Each generation of the genetically defined surface function is scored with a testing function. High scoring surfaces are allowed to go on to the next generation, thus to provide a test of the fit of the surfaces to provide an ideal result.

In the present case the widths and heights of all portions of the design including the diffraction grating and the fresnel portion are provided in terms of a set of seed functions. The resulting surface profile is tested with the testing function, with the testing function giving an overall weight to the profile generated. Succeeding generations of the design are based on the initial seeds plus random elements to allow for genetic variation. Iteratively stepping through this process provides a maximal fit for optimal design.

In one embodiment, with physical constraints as to step width and the overall pixel size, a seed set is generated which includes a particular step width and a pattern of step heights for each element. In one embodiment the microlens is to have a 330 micron diameter. This is broken up into 1.2 micron elements. The seed set generates a surface which is tested using standard diffraction grating theory to ascertain the diffraction efficiency and focusing capability. Standard diffraction grating theory is described in a text entitled Optics by Hecht, p. 312–465 in a section entitled Diffraction. The surface profile of the microlens can be described as a transmission phase grating with non-uniform placement of elements. The test function analyzes the phase contribution from each element from first principles of diffraction theory.

The test determines at a given off axis angle what the expected light intensity should be at a given color. The test also convolves the focusing merit figure, so that after a number of iterations in which random variations are added, an optimal solution is finally achieved.

This is accomplished by crossing for instance 5 seeds with each other. This means that the result of one seed is crossed with the result of another seed, with the results being tested. If 5 seeds are crossed one can obtain as many as 25 testable results. These results are tested and the worst 20 are discarded. The results are then crossed again along with a random seed input to permit the genetic change.

Thus, in general a genetic algorithm is one in which as number of seeds are used to create a result. The results are then crossed with each other to obtain multiple results which are then tested. Superior results are selected and crossed with each other along with a random seed factor and the results tested again. In this manner a large number of results can be tested to determine the optimal result.

In summary, a trimodal microlens configuration is provided for the lenses in a microlens array utilized as a diffraction separator for generating separated bands of different color when the microlens array is provided with a collimated light source. To provide the trimodal functionality, each microlens is divided up into three segments, with the center segment providing a red, green, blue diffraction pattern, with the left segment providing a blue, red, green diffraction pattern, and with the right segment providing a green, blue, red diffraction pattern. This pattern is directed towards an adjacent liquid crystal color display in which its sub-pixels are arranged red, green, blue, with the green sub-pixel aligned with the center segment of the corresponding lens. The result of the trimodal lens is an overlapping of illumination for each of the sub-pixels in that the lens segment aligned with the particular colored sub-pixel provides one third of the light, with the other two thirds of the light being provided by adjacent segments of the lenses in the microlens array. The result of the overlapping illumination of the sub-pixels is that the viewing direction is symmetric about a normal to the array which makes the design of the diffuser used with liquid crystal displays quite simple and eliminates off-axis dead zones. The trimodal structure of the microlens also permits fabrication of a thin lens which minimizes the number of steps for a diffraction grating and focusing lens and thus limits the number of etching steps required as well as making the etching process easier to control.

BRIEF DESCRIPTION OF THE DRAWINGS

These and other features of the subject invention will be better understood in connection with the Detailed Description taken in conjunction with the Drawings of which.

DETAILED DESCRIPTION

Figure 1:
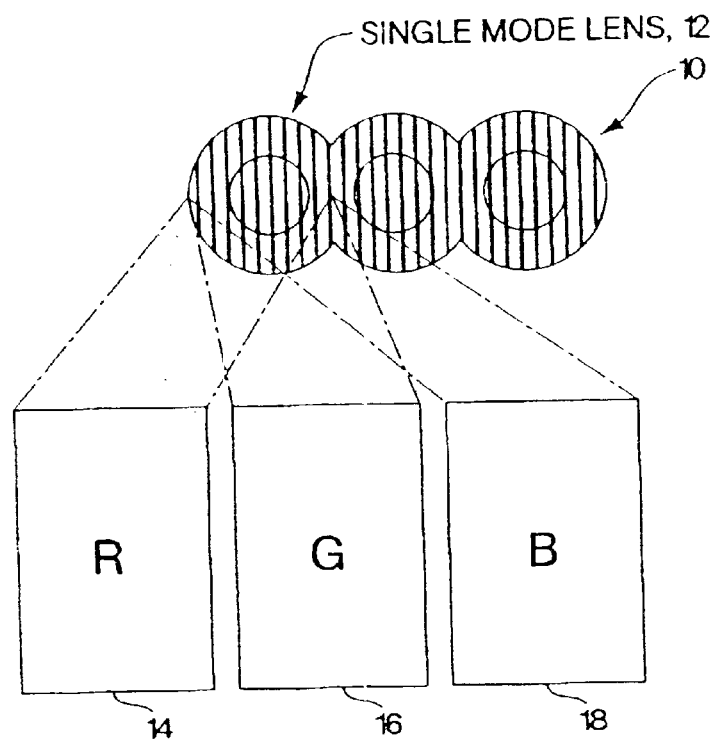
FIG. 1 is a diagrammatic illustration of the diffraction pattern produced by a single mode microlens, illustrating that all portions of the single mode lens contributed to light for each of the red, green and blue bands produced by the microlens.

As illustrated in FIG. 1, a single mode lens array 10 is provided with a number of adjacent single mode lenses 12, with each single mode lens providing bands 14, 16 and 18 of colored light, with the entire lens providing illumination for each of the colored bands.

Figure 2:
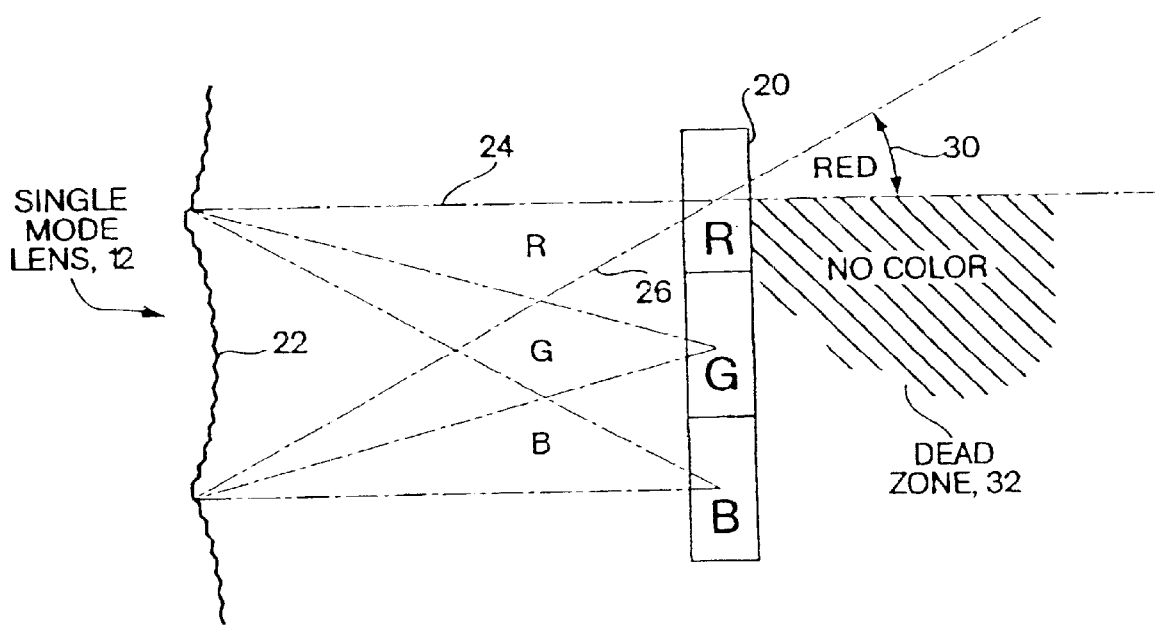
FIG. 2 is a diagrammatic representation of the illumination of a red sub-pixel utilizing a single mode microlens in which there is a region below the normal to the red sub-pixel which carries no color and which will appear black to the viewer when viewed from an off-axis position.

While this type of single mode microlens is quite suitable for use in applications involving improving the brilliance and color saturation of a color liquid crystal display, as illustrated in FIG. 2, the light provided to a red sub-pixel here illustrated at 20, comes from the entire surface 22 of the single mode microlens. The viewing angle for the illumination is illustrated by dashed lines 24 and 26. The result of illuminating sub-pixel 20 in this manner is that the red color is viewable in a zone 30 illustrated by the corresponding double ended arrow, whereas the viewer will see no red color in the dead zone illustrated at 32, without a compensating diffuser, because no light impinges on red sub-pixel 20 from any other microlens.

Figure 3:
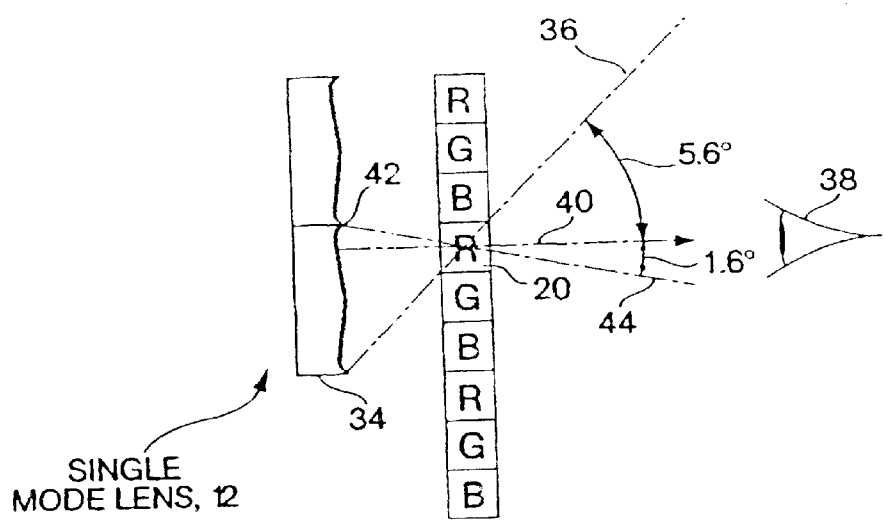
FIG. 3 is a diagrammatic illustration of the off-axis problem associated with a single mode lens in which viewing the red sub-pixel from below 1.6 degrees of the normal results in a lack of ability to view red light from the sub-pixel.

More specifically, and referring to FIG. 3, it will be appreciated that single mode lens 12 provides light from its lowest position here illustrated at 34, such that line 36 through red sub-pixel 20 describes the upper most region at which light is viewable from a position 38. The normal to this red sub-pixel is shown by dashed line 40, whereas the upper extent 42 of lens 12 provides light through sub-pixel 20 as illustrated by dashed line 44. What can be seen from this view is that the red light from this sub-pixel is viewable above the normal to an angle of 5.6 degrees, whereas the viewing angle below the normal is only 1.6 degrees, resulting in the aforementioned dead zone of FIG. 2. The specific angles listed are for one instance of a liquid crystal display panel and will vary depending on the physical characteristics of display. The asymmetric nature of the output will be common to all liquid crystal displays using this technique of color separation.

Figure 4:
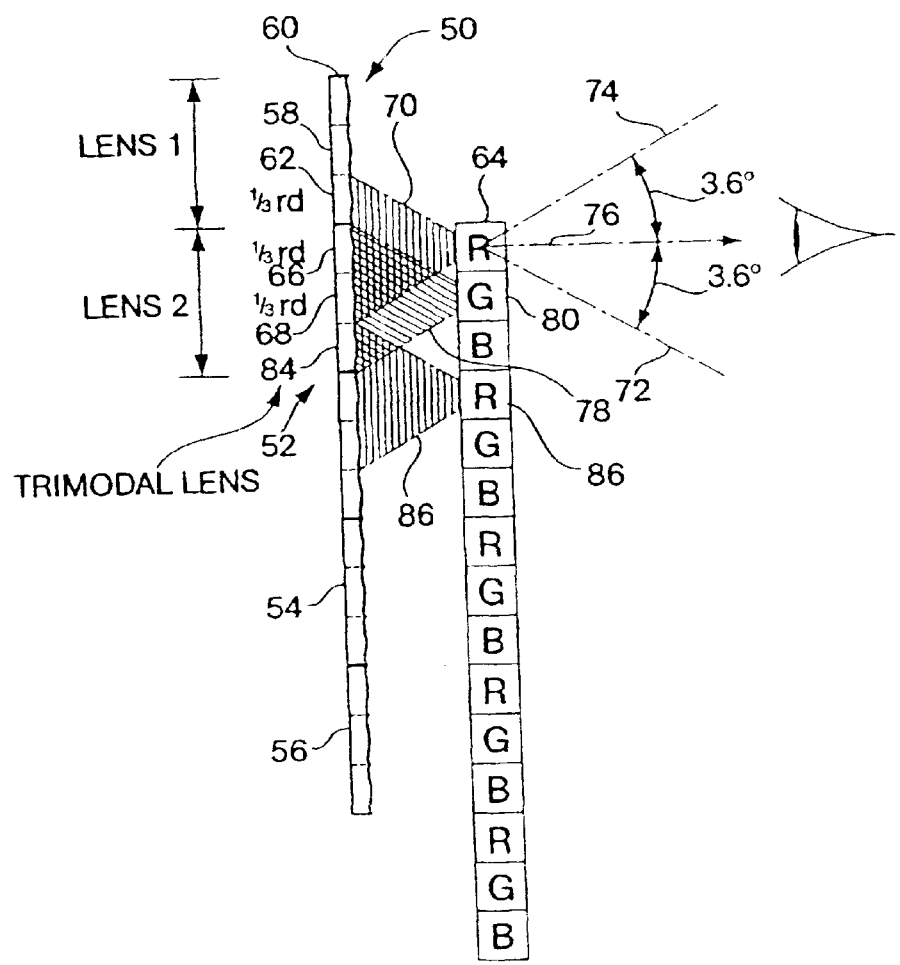
FIG. 4 is a diagrammatic illustration of the utilization of the subject trimodal lens in which light from the red sub-pixel is symmetric about the normal thereto and in which one third of the light for a given sub-pixel comes from the trimodal lens segment immediately opposite the sub-pixel, with the other two thirds of the light coming from trimodal lens segments to either side of this lens segment.

Referring now to FIG. 4, an array of trimodal lenses 50, 52, 54 and 56 is shown with each of the trimodal lenses having a center segment 58, an upper segment 60 and a lower segment 62.

The center segment of each of the trimodal lenses has a diffraction grating which provides a red, green, blue pattern, whereas the upper one third segment of each microlens has a diffraction grating which provides a blue, red, green pattern, whereas the lowest segment has a diffraction grating which provides a green, blue, red pattern.

Thus each of the trimodal lenses is divided into three segments with the center segment providing the usual diffraction pattern and the segments adjacent it providing altered diffraction patterns to meet the requirements that the light from each of the sub-pixels resulting from illumination from the microlenses is symmetric around the normal to the display, and that light from each segment directs colored light to the closest appropriate subpixel, thereby reducing the focusing power needed.

As can be seen in FIG. 4, for a red sub-pixel 64 the light illuminating this sub-pixel comes from segment 62 of Lens 1 as well as from segments 66 and 68 of Lens 2. It will be appreciated that segment 62 is the bottom one third of Lens 1, whereas segment 66 is the top one third of Lens 2 and segment 68 is the central segment of Lens 2. The light illuminating red sub-pixel 64 is indicated by shading 70. The bounds of the red illumination are illustrated by lines 72 and 74 which pass through the center of red sub-pixel 64 such that with respect to a normal 76 to the red pixel, light is symmetrically viewable about the normal as illustrated. In one embodiment the light is viewable 3.6 degrees above and below the normal.

As can be seen by shaded area 78, a green sub-pixel 80 is illuminated by segments 66, 68 and 84. It will also be appreciated is that shaded area 86 shows the illumination of red sub-pixel 86 from three adjacent segments of the lenses in the array.

What will be appreciated is that due to the special configurations of the surfaces of the trimodal lens and the particular diffraction pattern provided by each of the lens segments, each of the sub-pixels is illuminated by three adjacent microlens segments which provides symmetric illumination of a sub-pixel. This means that the off-axis viewing of the liquid crystal display can be compensated for through a simplified diffuser as opposed to a more complicated diffuser which must fill in the dead zones associated with single mode microlenses.

Figure 5:
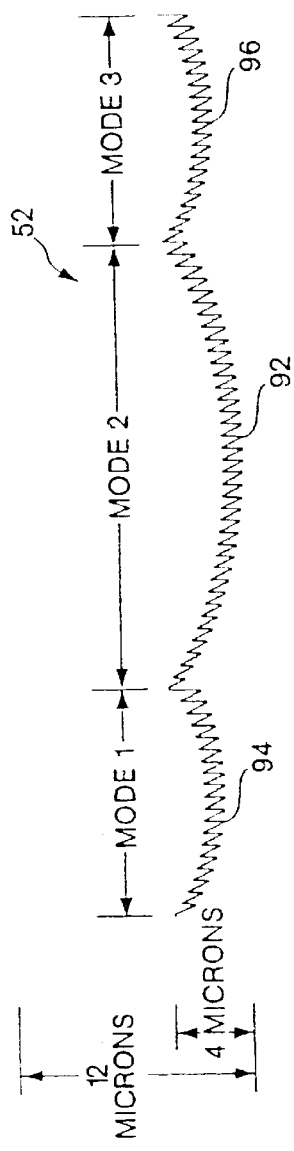
FIG. 5 is a diagrammatic and cross segmental illustration of the subject trimodal microlens in which the center segment produces a predetermined diffraction pattern which is different from that produced by the segments of the lens to either side of this center segment, also illustrating that the relative thickness of the trimodal microlens is about one third that of a single mode microlens.

Referring now to FIG. 5, microlens 52 is illustrated in which the surface of the microlens is divided into three parts corresponding to Modes 1, 2, and 3. As would be expected, the surface 92 of the central third of lens 52 is configured similarly to that of the single mode lens, whereas Modes 1 and 3 having surfaces respectively 94 and 96 are configured in accordance with an iteratively applied genetic algorithm to provide the indicated diffraction bands.

Figure 6:
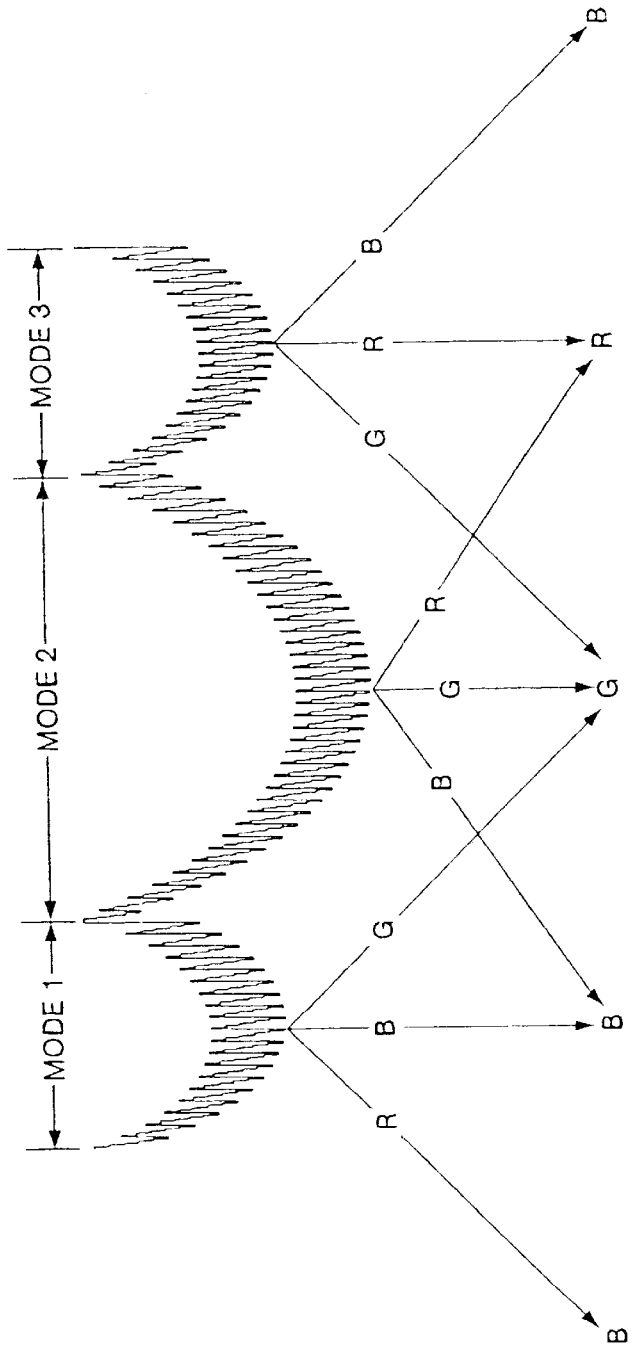
FIG. 6 is a diagrammatic illustration of the diffraction gratings of the three segments the microlens of FIG. 5, in which, the central segment of the microlens provides the traditional red, green, blue diffraction pattern, whereas the segment to one side provides a blue, red, green diffraction pattern and whereas the segment to the other side provides a green, blue, red diffraction pattern; and, FIG. 7 is a diagrammatic representation of an array of trimodal microlenses in which for a red sub-pixel, this sub-pixel derives its illumination from the top third of a microlens which is aligned with a normal to the red sub-pixel, with the red sub-pixel also being illuminated by the diffracted light from a lens segment immediately above the lens segment along the normal and immediately below the lens segment along the normal.

As can be seen in FIG. 6, the diffraction gratings of the three segments of the microlens giving rise to the three modes produce bands of color in the indicated order. It is the fact of the trimodal microlens having three sets of gratings which provides for the appropriate bands of color to be projected onto the correct sub-pixels of the display.

Figure 7:
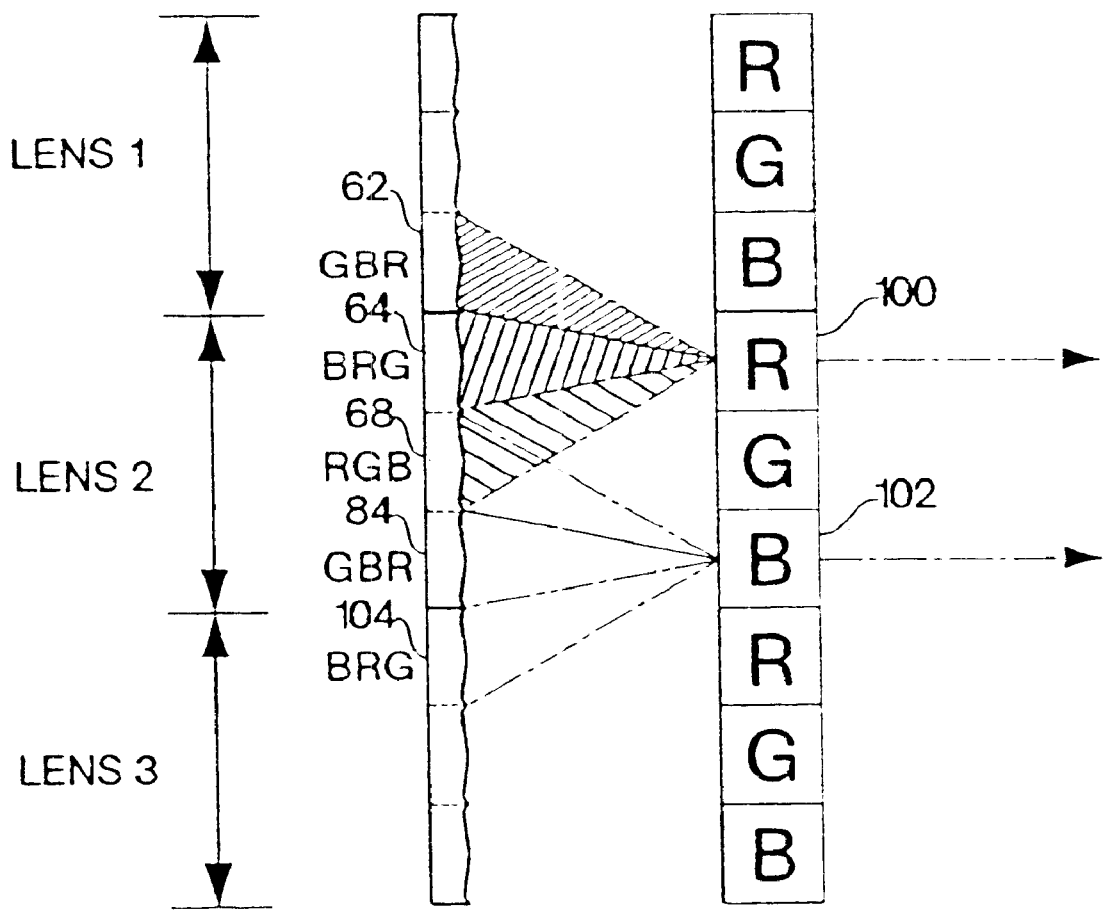

Referring now to FIG. 7, it can be seen that for a given sub-pixel 100 the light impinging thereon from lens segment 62 is the lower portion of the green, blue, red diffraction pattern from this segment of the microlens array. Likewise, for segment 64, the illumination is from the middle portion of the blue, red, green diffraction pattern for this lens segment, whereas for segment 68, the light is from the upper portion of the red, green, blue diffraction pattern.

For sub-pixel 102, light for this sub-pixel is from segment 68 which produces the aforementioned red, green, blue diffraction pattern, whereas segment 84 provides the appropriate light due to its green, blue, red diffraction pattern. Also as illustrated by lens segment 104, light for sub-pixel 102 comes from the upper portion of the diffraction pattern which is the blue, red, green diffraction pattern identical to that of segment 66.

What will be appreciated is that due to the different diffraction patterns for the three segments of each microlens, when the microlenses are arrayed end-to-end, it is possible to provide illumination for a given sub-pixel from three adjacent microlenses segments. What this mean is that not only will the viewing angle of the light from the particular sub-pixel be symmetric around the normal thereto, the microlens itself may be one third the thickness of the corresponding single mode microlens due to the decrease in etch step depth necessary to provide the appropriate color separated bands. The reason that the etch step depth is limited in the trimodal lens case is because the colored bands need not be projected off-axis to any great degree, as opposed to the single mode lens in which at least one colored band must be projected off-axis at a rather large angle.

What is claimed is:

1. A microlens for use in s color liquid display, comprising:

a lens having a surface which provides both focusing of incident collimated light and which diffracts the incident light into colored bands, said lens having multiple segments, each segment having a diffraction grating which diffracts incident light into a different pattern of colored bands, wherein a sub-pixel of said color liquid crystal display is provided with overlapping illumination so as to eliminate off axis dead zones.

2. The microlens of claim 1, wherein said microlens has three different segments.

3. The microlens of claim 2, wherein the three segments of said microlens diffract incident light into a red, green, blue diffraction pattern for the center segment, a blue, red, green diffraction pattern for one outer segment, and a green, blue, red diffraction pattern for the other outer segment.

4. The microlens of claim 3, wherein said liquid crystal display has an array of red, green, blue sub-pixels and wherein a number of said microlenses are arrayed such that the center segment of a microlens is adjacent a green sub-pixel, with the first mentioned outer segment adjacent a red sub-pixel, and with the other outer segment adjacent a blue sub-pixel, such that there is overlapping of illumination of a sub-pixel, whereby the viewing direction of light from a given sub-pixel is symmetric about a normal to said sub-pixel, thus to simplify diffuser design and eliminate off axis dead zones.

5. The microlens of claim 1, wherein the surface of said lens is defined by an iterative genetic algorithm.

6. A method of eliminating off-axis dead zones for sub-pixels in a liquid crystal display which is provided with colored light bands produced by collimated light illumination of a microlens array, in which the microlenses of the microlens array provide bands of different colored light to illuminate different sub-pixels, comprising the steps of:

providing that each of the microlenses in the microlens array be trimodal in which each lens is divided into three segments, with the center segment having a red, green, blue diffraction pattern, with a segment to one side of the center segment having a blue, green, red diffraction pattern, and with a segment to the other side of the central segment providing a green, blue, red diffraction pattern, thus to provide overlapping illumination of a sub-pixel with light from the sub-pixel from different lens segment, being symmetric about a normal thereto.

7. The method of claim 6, wherein a green sub-pixel is adjacent the center segment a red sub-pixel is adjacent the segment to one side of the center segment and wherein a blue sub-pixel is adjacent the segments.

* * * * *

UNITED STATES PATENT AND TRADEMARK OFFICE
CERTIFICATE OF CORRECTION

PATENT NO. : 6,487,017 B1
DATED : November 26, 2002
INVENTOR(S) : Thomas V. Gunn et al.

It is certified that error appears in the above-identified patent and that said Letters Patent is hereby corrected as shown below:

Title page,
Item [73], Assignee, delete "Bae", insert -- BAE --

Column 3,
Line 29, delete "as", insert -- a --

Column 5,
Line 51, delete "is"

Column 6,
Line 32, delete "mean", insert -- means --
Line 44, delete "s", insert -- a --

Signed and Sealed this

Twentieth Day of July, 2004

JON W. DUDAS
*Acting Director of the United States Patent and Trademark Office*